United States Patent
Zhang et al.

(10) Patent No.: US 9,020,279 B2
(45) Date of Patent: Apr. 28, 2015

(54) IMAGE PROCESSING METHODS AND APPARATUSES

(71) Applicants: Tsinghua University, Beijing (CN); Nuctech Company Limited, Beijing (CN)

(72) Inventors: Li Zhang, Beijing (CN); Zhiqiang Chen, Beijing (CN); Jia Hao, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 14/146,263

(22) Filed: Jan. 2, 2014

(65) Prior Publication Data

US 2014/0193086 A1    Jul. 10, 2014

(30) Foreign Application Priority Data

Jan. 10, 2013  (CN) .......................... 2013 1 0010091

(51) Int. Cl.
*G06K 9/68* (2006.01)
*G06K 9/62* (2006.01)
*G06T 5/50* (2006.01)

(52) U.S. Cl.
CPC .............. *G06K 9/6202* (2013.01); *G06T 5/50* (2013.01); *G06T 2211/408* (2013.01)

(58) Field of Classification Search
USPC ......... 382/220, 209, 218, 219, 264, 154, 199; 345/629; 348/169, 170, 171, 453, 348/E13.014, 223.1, 231.3; 358/450, 452
See application file for complete search history.

(56) References Cited

U.S. PATENT DOCUMENTS

| | | | |
|---|---|---|---|
| 7,706,601 B2 * | 4/2010 | Hamanaka | 382/154 |
| 8,131,068 B2 * | 3/2012 | Abe et al. | 382/162 |
| 8,311,341 B1 * | 11/2012 | Podilchuk | 382/218 |
| 2012/0121162 A1 | 5/2012 | Kim et al. | |

FOREIGN PATENT DOCUMENTS

| | | |
|---|---|---|
| CN | 101980302 A | 2/2011 |
| CN | 102063728 A | 5/2011 |

OTHER PUBLICATIONS

International Search Report for PCT Application No. PCT/CN2013/081734, dated Nov. 28, 2013, 3 pages.
(Continued)

*Primary Examiner* — Anh Do
(74) *Attorney, Agent, or Firm* — Westman, Champlin & Koehler, P.A.

(57) ABSTRACT

Provided are image processing method and apparatus. The method includes selecting one of a plurality of images matched in structure as reference image, and select another of the images as subject image; for a subject pixel in the subject image, determining a pixel corresponding to the subject pixel in the reference image; calculating similarity values of at least part of pixels in the reference image with respect to the pixel corresponding to the subject pixel; establishing weight coefficients based on the similarity values, and weighted averaging the subject pixel in the subject image to obtain a processed pixel value. With the above solutions, it is possible to use structure information of a higher-quality image in processing another image, and thus improve quality of the other image.

21 Claims, 9 Drawing Sheets

(56) References Cited

OTHER PUBLICATIONS

English translation of Box V. of Written Opinion for International Search Report for PCT Application No. PCT/CN2013/081734, 4 pages.

Written Opinion for International Search Report for PCT Application No. PCT/CN2013/081734, dated Nov. 28, 2013, 5 pages.

Bi et al., "Low-Dose CT Image Restoration Using a Non-Local Weights Prior from Previous Normal-Dose Scan Image", ACTA Electronica Sinica, vol. 38, No. 5, May 2010, 6 pages.

\* cited by examiner

IMAGE PROCESSING METHODS AND APPARATUSES

CROSS-REFERENCE TO RELATED APPLICATION

This Application is a non-provisional Application of Chinese Application No. CN 201310010091.2, filed Jan. 10, 2013, in Chinese, the contents of which are hereby incorporated by reference in their entirety.

TECHNICAL FIELD

Embodiments of the present invention relates to image processing, and in particular to restoring structure information and suppressing noises and artifacts in an image.

BACKGROUND

Since introduced in 1976, the dual-energy CT technology has been widely used in various fields including safety inspection, and medical care. The technology scans a subject by using two x-ray sources of different energy levels to obtain raw data at the two different energy levels. With these data, information about the subject, such as atomic number, electron density, and attenuation coefficient, can be restructured through respective image processing algorithms. The dual-energy CT technology has advantages of reconstructing not only attenuation coefficient images that can be obtained by the single-energy CT imaging technology but also atomic number and electron density information of the subject. The dual-energy CT technology is more powerful in distinguishing materials than the convention single-energy CT technology.

Currently, the dual-energy CT technology is mainly implemented in several approaches as follows. The first approach is to scan a subject twice with ray sources of different energy-levels, and radiation dose and scanning time are about twice greater than one-time scanning. Low-energy and high-energy perspective images should be registered to ensure that pixels of the same coordinates on the two images correspond to the same ray path. The second one is to utilize a ray source capable of switching a high voltage at high frequency. While the subject is passing through the view field of ray scanning, the ray source emits alternatively low-energy and high-energy rays at a very high frequency. This approach requires only one scanning process in imaging operation. The disadvantage is that pixels of the same coordinates on the low-energy and high-energy images can just correspond to adjacent ray paths. This approach is commonly adopted when an accelerator functions as ray source. The third approach is to implement dual-energy imaging with double-deck detectors specifically designed. During the scanning process, rays after penetrating a subject reach low-energy detectors first, penetrate a filter sheet, and then reach high-energy detectors. In this case, pixels on the two perspective images automatically correspond to the same ray path. Compared with the first and second approaches, this approach has smaller energy difference between high-energy and low-energy rays, and higher requirement on material recognition algorithms. Generally speaking, the previous two approaches are called true dual-energy, and the last approach is called false dual-energy.

After obtaining high-energy and low-energy projection data, the dual-energy CT technology performs dual-energy decomposition and reconstruction to obtain atomic number and distribution of electron density of the scanned subject. However, in real applications, x rays at different energy levels have different penetration capabilities, and thus the high-energy and low-energy data obtained by the dual-energy CT have signal-to-noise ratios (SNRs) significantly different from each other. This has a great impact on the final reconstruction result, and image quality is affected by noise. Meanwhile, in the reconstruction process, errors due to dual-energy decomposition and the like will degrade image quality for atomic number, and cause severe noise and artifact. Thus, it is impossible to effectively recognize structure information, thereby affecting accuracy of material recognition.

SUMMARY

In view of the problem of poor image quality with the conventional technology, embodiments of the present invention provide an image processing method and apparatus to improve image quality.

According to an embodiment of the present invention, an image processing method is provided comprising: selecting one of a plurality of images matched in structure as a reference image, and select another of the images as a subject image; for a subject pixel in the subject image, determining a pixel corresponding to the subject pixel in the reference image; calculating similarity values of at least part of pixels in the reference image with respect to the pixel corresponding to the subject pixel; establishing weight coefficients based on the similarity values, and weighted averaging the subject pixel in the subject image to obtain a processed pixel value.

According to an embodiment of the present invention, said calculating similarity values of at least part of pixels in the reference image with respect to the pixel corresponding to the subject pixel comprises calculating, as similarity value, a Gaussian weighted Euclidean distance between each of image blocks where the at least part of pixels in the reference image are respectively located and an image block corresponding to an image block where the subject pixel is located.

According to an embodiment of the present invention, said calculating similarity values of at least part of pixels in the reference image with respect to the pixel corresponding to the subject pixel comprises calculating, as similarity value, a structure similarity index between each of image blocks where the at least part of pixels in the reference image are respectively located and an image block corresponding to an image block where the subject pixel is located.

According to an embodiment of the present invention, if a difference between an average of pixels in an image block where certain pixel in the reference image is located and an average of pixels in the image bock where the subject pixel is located is greater than a predetermined threshold, no similarity value is calculated for the two pixels.

According to an embodiment of the present invention, a specific region containing the subject pixel is selected from the subject image, and said calculating similarity values of at least part of pixels in the reference image with respect to the pixel corresponding to the subject pixel comprises calculating, as similarity value, a Gaussian weighted Euclidean distance between each of image blocks where pixels in a corresponding specific region in the reference image are respectively located and an image block corresponding to an image block where the subject pixel is located.

According to an embodiment of the present invention, a specific region containing the subject pixel is selected from the subject image, and said calculating similarity values of at least part of pixels in the reference image with respect to the pixel corresponding to the subject pixel comprises calculating, as similarity value, a structure similarity index between each of image blocks where pixels in a corresponding specific region in the reference image are respectively located and an image block corresponding to an image block where the subject pixel is located.

According to an embodiment of the present invention, if a difference between an average of pixels in an image block where certain pixel in the corresponding specific region in the reference image is located and an average of pixels in the image bock where the subject pixel is located is greater than a predetermined threshold, no similarity value is calculated for the two pixels.

According to an embodiment of the present invention, said determining a pixel corresponding to the subject pixel in the reference image comprises determining the corresponding pixel in the reference image based on location information of the subject pixel in the subject image.

According to an embodiment of the present invention, the reference image has higher image quality than the subject image, and the image quality comprises one of signal-to-noise ratio, sharpness, contrast, resolution, and definition.

According to an embodiment of the present invention, the reference image comprises a high-energy or low-energy attenuation coefficient image obtained by a dual-energy CT imaging system, and the subject image comprises an atomic number image or an electron density image.

According to an embodiment of the present invention, the high-energy or low-energy attenuation coefficient image is used to correct metal artifact in the electron density image or the atomic number image.

According to an embodiment of the present invention, the reference image comprises a full-sample image, and the subject image comprises a sparse-sample image.

According to an embodiment of the present invention, the full-sample image is used to correct aliasing artifact in the sparse-sample image.

According to an embodiment of the present invention, a pixel having a higher similarity value corresponds to larger weight, and a pixel having a lower similarity value corresponds to smaller weight.

According to an embodiment of the present invention, the reference image comprises CT image, and the subject image comprises an image obtained from PET or SPECT modality.

According to an embodiment of the present invention, an image processing apparatus is provided comprising: means for selecting one of a plurality of images matched in structure as reference image, and selecting another of the images as subject image; means for determining, for a subject pixel in the subject image, a pixel corresponding to the subject pixel in the reference image; means for calculating similarity values of at least part of pixels in the reference image with respect to the pixel corresponding to the subject pixel; means for establishing weight coefficients based on the similarity values, and weighted averaging the subject pixel in the subject image to obtain a processed pixel value.

According to an embodiment of the present invention, said means for calculating similarity values of at least part of pixels in the reference image with respect to the pixel corresponding to the subject pixel comprises means for calculating, as similarity value, a Gaussian weighted Euclidean distance between each of image blocks where the at least part of pixels in the reference image are respectively located and an image block corresponding to an image block where the subject pixel is located.

According to an embodiment of the present invention, said means for calculating similarity values of at least part of pixels in the reference image with respect to the pixel corresponding to the subject pixel comprises means for calculating, as similarity value, a structure similarity index between each of image blocks where the at least part of pixels in the reference image are respectively located and an image block corresponding to an image block where the subject pixel is located.

According to an embodiment of the present invention, a specific region containing the subject pixel is selected from the subject image, and said means for calculating similarity values of at least part of pixels in the reference image with respect to the pixel corresponding to the subject pixel comprises means for calculating, as similarity value, a Gaussian weighted Euclidean distance between each of image blocks where pixels in a corresponding specific region in the reference image are respectively located and an image block corresponding to an image block where the subject pixel is located.

According to an embodiment of the present invention, a specific region containing the subject pixel is selected from the subject image, and said means for calculating similarity values of at least part of pixels in the reference image with respect to the pixel corresponding to the subject pixel comprises means for calculating, as similarity value, a structure similarity index between each of image blocks where pixels in a corresponding specific region in the reference image are respectively located and an image block corresponding to an image block where the subject pixel is located.

According to an embodiment of the present invention, said means for determining a pixel corresponding to the subject pixel in the reference image comprises means for determining the corresponding pixel in the reference image based on location information of the subject pixel in the subject image.

With the above solutions, it is possible to use structure information of a higher-quality image in processing another image, and thus improve quality of the other image.

BRIEF DESCRIPTION OF THE DRAWINGS

The following figures illustrate implementations of the present invention. The figures and implementations provide some embodiments of the present invention in a non-limiting and non-exclusive manner, in which.

DETAILED DESCRIPTION OF THE EMBODIMENTS

Figure 1:
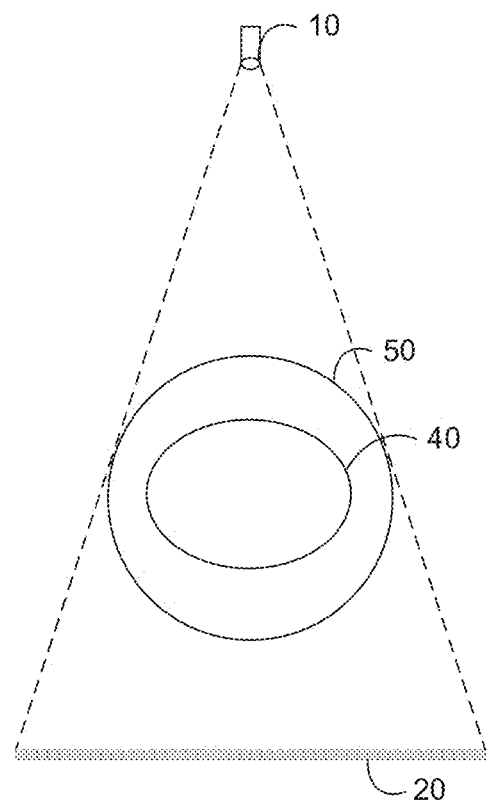
FIG. 1 is a schematic diagram depicting a CT imaging process in a method according to an embodiment of the present invention.

In the following, particular embodiments of the present invention will be detailed. To be noted, the described embodiments are just intended for illustrating other than limiting the present invention. Numerous specific details are illustrated for a clear and thorough understanding of the present invention. It is apparent to those skilled in the art that these specific details are not necessary for implementation of the present invention. Detailed description of known circuits, materials or methods are omitted which otherwise may obscure the present invention.

Throughout the specification, reference to "an embodiment," "embodiments," "an example" or "examples" means that particular features, structures or characteristics described in connection with such embodiment or example are contained in at least one embodiment of the present invention. The phrase "an embodiment," "embodiments," "an example" or "examples" in various places throughout the specification does not necessarily refer to the same embodiment or example. Further, the particular features, structures or characteristics may be contained in one or more embodiments or examples in any appropriate combination and/or sub-combination. Those skilled in the art will appreciate that the term "and/or" herein indicates any or all combinations of one or more of the listed items.

In view of image quality problems with the conventional technology, embodiments of the present invention provide an image processing technology which makes use of structure information of a reference image, and processes another defective image (i.e., subject image) having identical structure and different grey distribution. The method can effectively reduce noise, singular point and artifact in the defective image, or restore the structure information of the image, while maintaining the distribution of values in the image.

In the dual-energy CT imaging technology, for example, high-energy and low-energy reconstructed images, atomic number distribution and electron density distribution of a scanned object can be obtained simultaneously during the dual-energy CT scanning process. These images thus obtained have different qualities. In particular, the reconstruction result of atomic number has significant noise, and much of structure information is lost. This severely affects material recognition. In some cases, there are artifacts of different shapes in certain images. In the image processing method of embodiments of the present invention, if one of several images matched in structure has higher quality, this image is used as reference image to establish a similarity relation among pixels, and it performs weighted average on another lower-quality image. In this way, it is possible to recover structure information of the image and improve signal-to-noise ratio. The method utilizes the structure information of the reference image, maintains the value information of the subject image, and combines information in the two images. This concept can be applied in, but not limited to, the dual-energy CT technology.

FIG. 1 is a schematic diagram depicting a CT imaging process in a method according to an embodiment of the present invention. As shown in FIG. 1, an object under inspection is placed on a stage 50 between a ray source 10 and a detector 20. By performing dual-energy CT scanning on the object with x rays of different energy levels generated at the ray source 10, it is possible to reconstruct high-energy attenuation coefficient image, low-energy attenuation coefficient image, atomic number image, and electron density image.

Figure 2A:
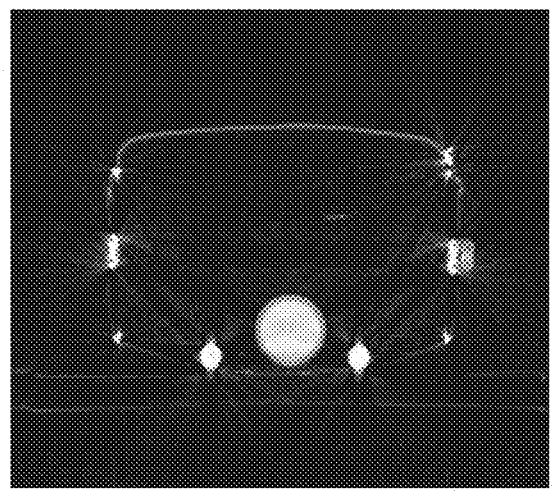
FIG. 2A shows an example of high-energy attenuation coefficient image obtained by dual-energy CT imaging technology.
Figure 2B:
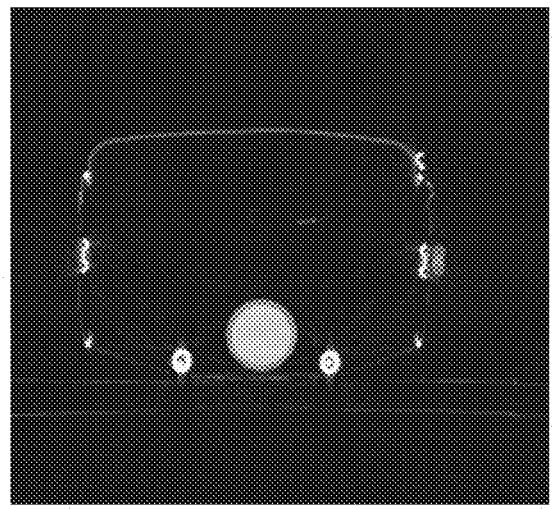
FIG. 2B shows an example of low-energy attenuation coefficient image obtained by dual-energy CT imaging technology.
Figure 2C:
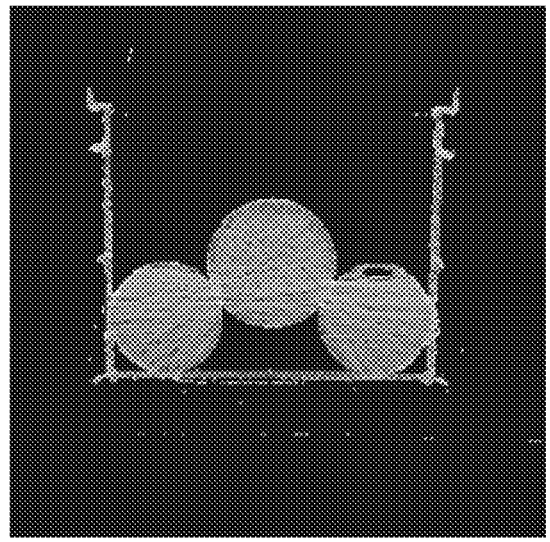
FIG. 2C shows an example of atomic number image obtained by dual-energy CT imaging technology.
Figure 2D:
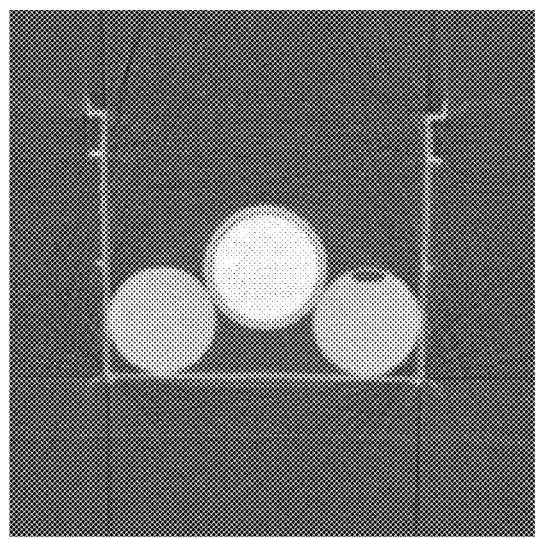
FIG. 2D shows an example of electron density image obtained by dual-energy CT imaging technology.

FIGS. 2A and 2B shows high-energy and low-energy attenuation coefficient images obtained by performing dual-energy CT scanning on a luggage trunk, respectively. FIGS. 2C and 2D shows atomic number image and electron density image obtained through dual-energy reconstruction, respectively. As can be intuitively seen from the figures, the impact of noise on image quality is severe.

In another example of using a dual-energy system having double-deck detectors, rays first pass through a front deck of detectors to obtain low-energy projection data, next through a filter sheet, and then through a rear deck of detectors to obtain high-energy projection data. Therefore, photons that can reach the detectors for high energy are reduced dramatically in number, leading to degraded SNR. On the other hand, the low-energy image has good SNR. It can be seen from the reconstructed images that the image for atomic number Z has lower SNR and image quality than the reconstructed image for electron density. As described above, 4 images of high-energy and low-energy reconstructed images, atomic number distribution image and electron density distribution image can be obtained simultaneously during one dual-energy CT scanning. It can be observed from the several images that their projection data and reconstructed images have different value distributions, but identical, exactly matched shapes and edges.

Figure 3:
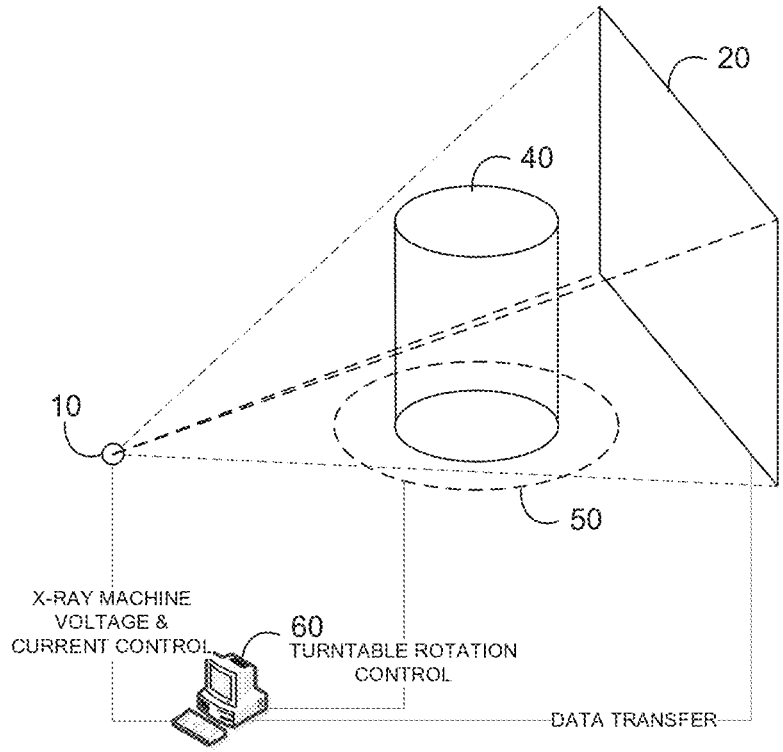
FIG. 3 is a schematic block diagram showing an imaging system according to an embodiment of the present invention.

FIG. 3 is a schematic diagram depicting the structure of CT apparatus according to an embodiment of the present invention, which includes an x-ray source 10, a mechanical motion device & controller, and a detector & data acquisition system.

The x-ray source 10 may be an x-ray machine capable of generating dual-energy x-rays, such as a dual-energy x-ray machine or a single-energy x-ray machine equipped with a filter. The mechanical motion device & controller includes a stage 50 for placing an object, a rack for x-ray machine and detector, and a control system. The stage 50 may be translated to adjust the position of rotation center, and the rack may be translated to align the x-ray machine and the detector 20 with the rotation center. The present embodiment will be described in the case of circular scanning trajectory, with the stage being rotated while the rack being stationary. The stage and the rack move relative to each other, and thus the method of the present embodiment can also be implemented with the stage being stationary while the rack being rotated.

The detector & data acquisition system 20 includes a plate of planar-array x-ray detector 20 that can fully cover the scanned object. The data acquisition device includes sense circuit, acquisition trigger circuit, and data transmission circuit.

The reconstruction device 60 includes, for example, a master data processing computer responsible for controlling operations of the CT system including mechanical rotation, electrical control, safety interlock control, and image reconstruction. According to some embodiments, the system may further include a display device coupled with the reconstruction device 60 and configured to display reconstructed images.

According to an embodiment of the present invention, the subject image has certain defect, such as having much noise, artifact or deformed structure. Meanwhile, there is another reference image of better quality. The reference image contains all the structure information of the subject image but has a different distribution of values. In this case, the structure information of the reference image can be used, as guidance, to process the subject image. In this way, it is possible to obtain a better image while maintaining the value information and grey distribution of the subject image.

Figure 4:
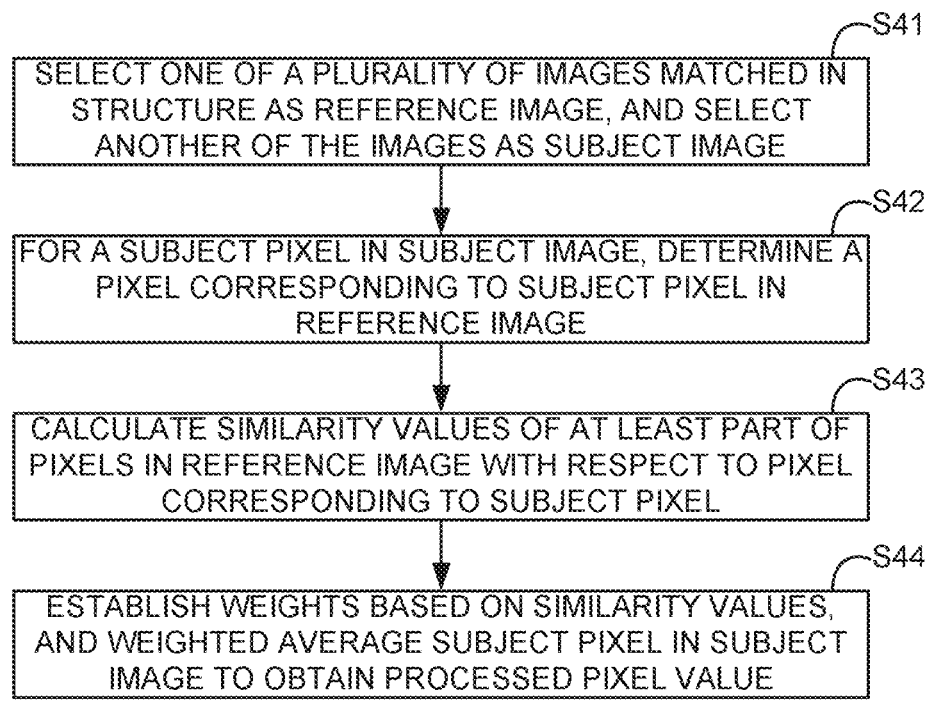
FIG. 4 is a flowchart showing an image processing method according to an embodiment of the present invention.

FIG. 4 is a flowchart showing an image processing method according to an embodiment of the present invention. As shown in FIG. 4, at step S41, one of a plurality of images matched in structure is selected as reference image, and another image is selected as subject image.

For example, after obtaining high-energy and low-energy attenuation coefficient images, atomic number image and electron density image during dual-energy CT imaging process, one of the images of higher quality may be used to process the other images. Assuming two images, one contains good structure information, while the other has certain defect (e.g., poor SNR, presence of artifact, structure deformed, and the like). If the two images are registered, all of structure information and edge information will be in exact correspondence, only the distribution of values is different. In this case, the method of the present invention can be applied to process the defective image.

The two images may be referred to as reference and subject images, respectively. The reference image is denoted as $I_{reference}$, and the subject image is denoted as I. For certain pixel I(i) in the subject image, an image block N(i) is established with the pixel being the center. The image block N(i) is usually a square of size n×n, n=2, 4, 8, . . . , for example.

At step S42, for the subject pixel in the subject image, a pixel in the reference image is determined corresponding to the subject pixel. For example, an image block N'(i) may be established at the corresponding location in the reference image $I_{reference}$. In some embodiments, the corresponding pixel herein indicates information of a real object represented by the co-located pixel. If the subject and reference images are completely registered, that is, exactly corresponding to each other on a pixel basis, the corresponding pixel will be a co-located pixel in the image. Such operations can be implemented in dual-energy CT image processing, for example. In some other applications, such as PET/CT image processing, it is necessary to first register the images. After the registration, co-located pixels may be selected for processing. In other words, if the subject and reference images are registered in structure, the process of determining a pixel in the reference image corresponding to the subject pixel may include determining the corresponding pixel in the reference image based on the location information of the subject pixel.

At step S43, similarity values are calculated between at least part of pixels in the reference image and the pixel corresponding to the subject pixel.

For example, search and calculation are performed throughout the reference image $I_{reference}$ on a pixel basis. Assuming a pixel $I_{reference}(j)$ is found, a distance is calculated between N'(j) and N'(i). Here, N'(j) denotes an image block of size n×n with the pixel $I_{reference}(j)$ being the center. An approach of calculating the similarity value is to calculate a Gaussian Weighted Euclidean distance, denoted as D(i, j), between N'(j) and N'(i). The distance is calculated between each pixel in the entire reference image $I_{reference}$ and the pixel $I_{reference}(j)$. it should be noted here that the approach of calculating the similarity value is merely an example, and there are other approaches, such as using a method of SSIM structure similarity index or other methods of representing similarity between two similar blocks. Any method can be used in the weighted average operation as long as it can represent similarity in structure and grey between two image blocks. According to an embodiment of the present invention, pixels having higher similarity will be given a greater weight during the weighted average operation. If required, normalization operation may be performed.

At step S44, weight coefficients are created based on the similarity values, and weighted averaging is performed on the subject pixel in the subject image to obtain a processed pixel. For example, the pixel I(i) in the subject image I may be weighted averaged in accordance with the following equation:

$$I_{processed}(i) = w(i,j)I(j)/C \quad (1)$$

The weight coefficient w(i,j) may depend on the similarity between two image blocks, that is, the similarity value D(i, j) calculated between the pixels i and j in the reference image $I_{reference}$. I(j) denotes a pixel value with suffix j in the subject image. When a Gaussian Weighted Euclidean distance is used to represent the similarity, the weight coefficient function may be created as follows:

$$w(i,j) = \exp(-D(i,j)/h^2) \quad (2)$$

Here, h denotes a filter parameter depending on noise distribution in the reference image $I_{reference}$. C denotes a normalization coefficient, that is, a value obtained by summing the weight coefficients w(i, j) for respective pixels j in the reference image.

The result is obtained following the above processes. It should be noted that the weight coefficient function is created depending on how the similarity is represented in calculating the similarity values. The method of the present invention is applicable as long as a greater weight is allocated to pixels having higher similarity, and not limited to the representation based on Gaussian Weighted Euclidean distance described above.

The method according to the embodiment of the present invention guarantees accuracy of values. By performing search and calculation in the reference image having relatively high quality, it is guaranteed that a similar pixel is allocated with a large weight coefficient, and a non-similar pixel is allocated with a small coefficient in the weighted average operation. In this way, the structure information in the reference image is introduced, while the numeric statistic characteristics of the subject image is not influenced and well maintained. Further, this method is easy to implement, robust and highly applicable.

In the above embodiment, similarity between two pixels is represented by similarity between the square image block containing the subject pixel (e.g., the square image block centered at the subject pixel) and each of the other image blocks. However, the present invention is not limited to this embodiment. For example, in another embodiment, the similarity may be calculated using a rectangular image block or image block of some other shape containing the subject pixel, or even using similarity between the subject pixel and each of the other pixels.

According to a further embodiment of the present invention, two approaches for accelerating the algorithm and thus reducing the computation complex may be used. One approach is to select a small search area around the subject pixel (or an area of interest) (e.g., a specific area in an image that contains pixels to be processed), instead of the entire image, and to calculate similarities between the subject pixel and respective pixels in a corresponding search area of the reference image. The other approach is to first calculate, in the reference image (or a specific area) an average value of each of image blocks in which the respective pixels are located, and not to calculate similarity if the calculated average value has a large difference (e.g., larger than a predetermined threshold) from the average value of a corresponding image block in which the subject pixel is located in the subject image. Similarity is calculated merely between pixels in image blocks having similar grey values and the subject pixel. Then, the weight function is created for the weighted average operation. The computation efficiency of the algorithm can be improved by using the above two approaches.

Figure 5A:
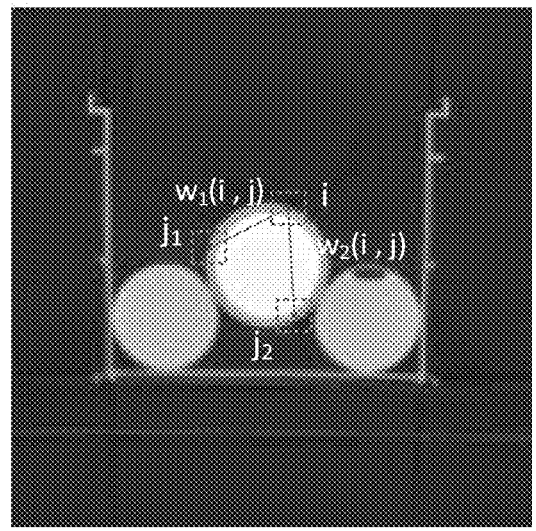
FIGS. 5A and 5B are processes of utilizing a low-energy attenuation coefficient image to process an atomic number image in an image processing method according to an embodiment of the present invention.
Figure 5B:
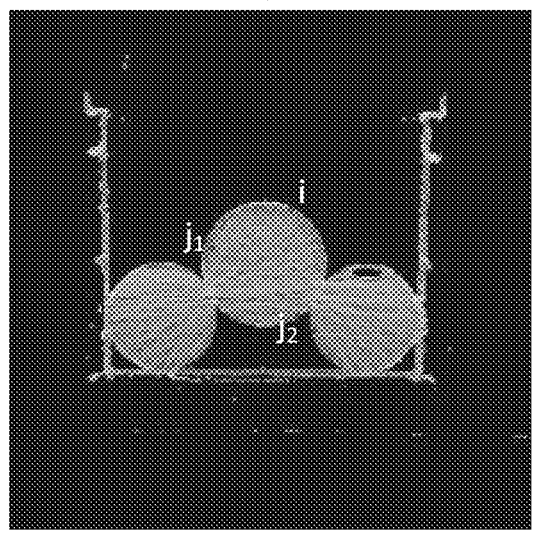

Hereafter, the above method will be described in a specific implementation of dual-energy CT imaging, which can simultaneously obtain four different images including high-energy reconstructed image, low-energy reconstructed image, atomic number distribution image, and electron density distribution image. The atomic number distribution image has very poor quality (as shown in FIG. 2C). In this case, the low-energy reconstructed image may be used as reference image to de-noise the reconstructed atomic number image. FIGS. 5A and 5B show specific examples of calculating weights in the method.

For a pixel to be de-noised ("i" in FIG. 5B) in the atomic number image, for example, a co-located pixel ("i" in FIG. 5A) is found in the low-energy CT reconstructed image. A distance is calculated between each of pixels ("$j_1, j_2$" in FIG. 5A) in the low-energy CT reconstructed image and the above pixel ("i" in FIG. 5A). The calculated distances are weighted Euclidean distances (e.g., $w_1$ (i, j) and $w_2$ (i, j)) between images blocks having the pixels as centers, respectively. After completing the distance calculation, a weight function is created based on the distances, and the corresponding pixels in the atomic number image ("$j_1, j_2$" in FIG. 5B) undergo a weighted average operation. Then, a normalization process is applied to obtain a de-noised value for the pixel to be de-noised.

Figure 6A:
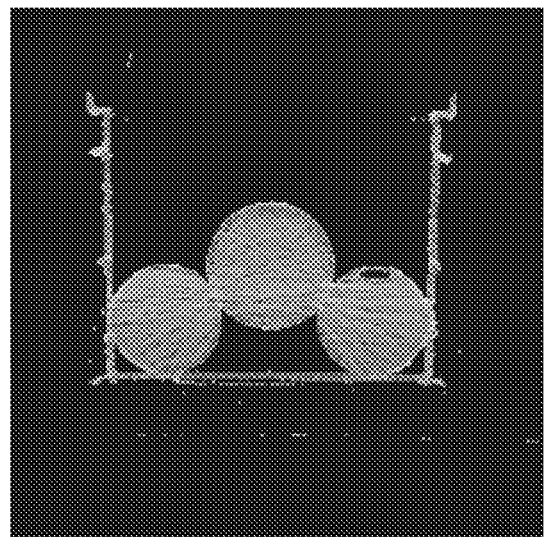
FIGS. 6A and 6B shows examples of atomic number images before and after processing.
Figure 6B:
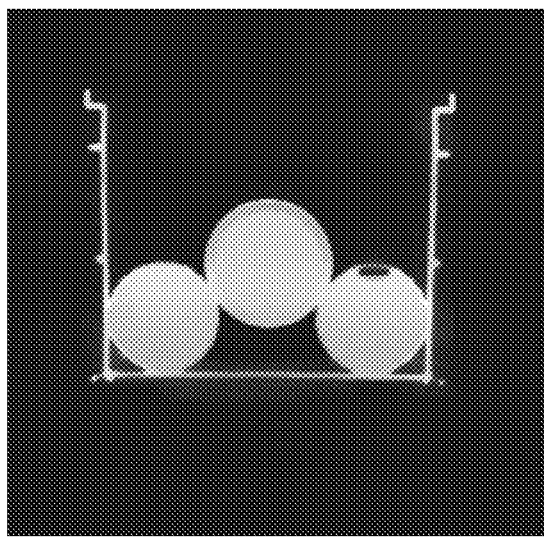
Figure 7A:
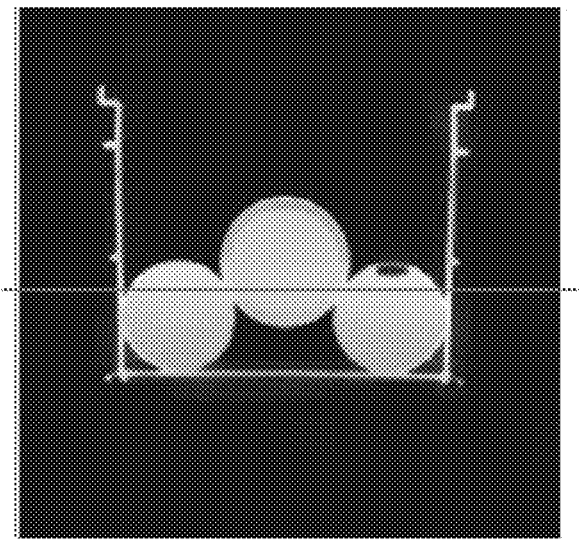
FIG. 7A shows an example of atomic number image after processing in which a section line is marked.
Figure 7B:
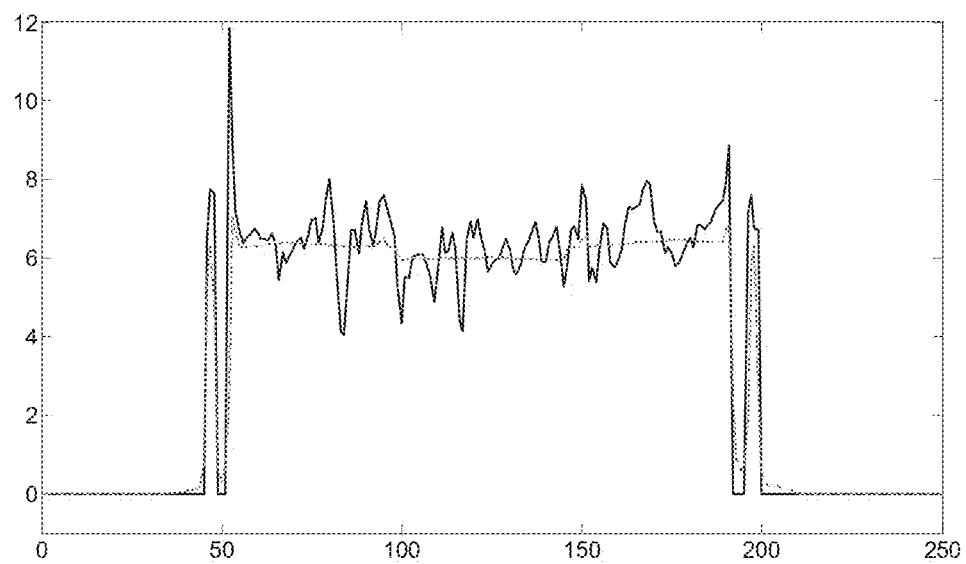
FIG. 7B shows a grey value distribution graph along the section line of FIG. 7A for atomic number images before and after processing.

Calculation is performed similarly and sequentially to all the pixels in the atomic number image, and a de-noised image is obtained. FIGS. 6A and 6B illustrate comparison of atomic number distribution images before and after the de-noising. It can be seen that the above method can effectively improve the quality of the atomic number image, and greatly reduce the noise. FIGS. 7A and 7B illustrate comparison of values along the section line before and after the above processing. FIG. 7B is a value comparison graph along the section line, in which the solid line denotes values in the raw image, and the dotted line denotes values in the image processed with the above method. It can be seen that the values are more accurate after de-noising with the method, thereby improving accuracy of material recognition.

Figure 8:
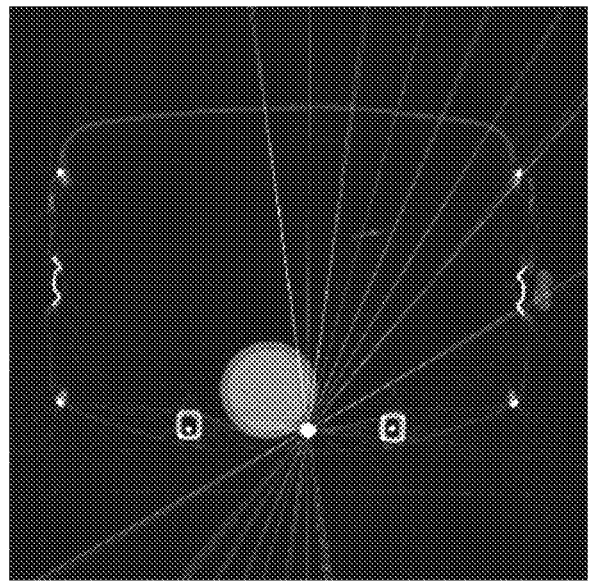
FIG. 8 shows an example of electron density image with metal artifact.
Figure 9:
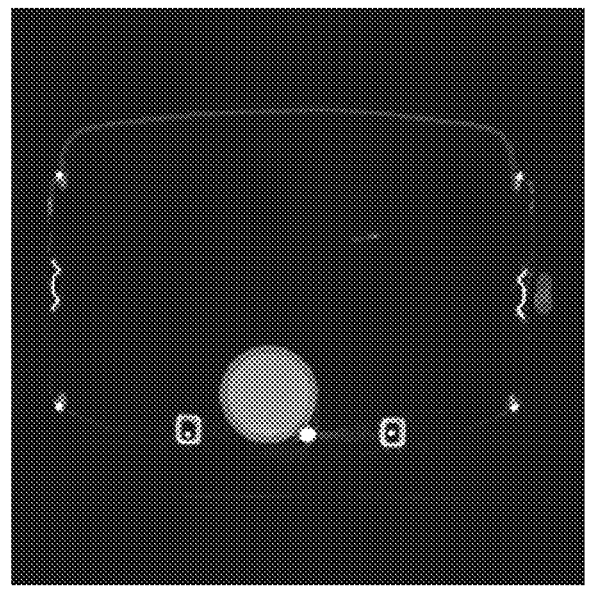
FIG. 9 shows an example of electron density image in which the metal artifact is processed using a high-energy attenuation coefficient image.

The method may also be applied to remove artifact in an image. For example, during the CT scanning operation, the reconstructed electron density distribution image and the atomic number image often have much artifact (as shown in FIG. 8) due to presence of metal, while the high-energy reconstructed attenuation image has less metal artifact. Therefore, the high-energy reconstructed attenuation image may be used as reference to process the electron density distribution image and the atomic number image as in the above method. In this way, the metal artifact in the images can be reduced. FIG. 9 shows the processing result.

Figure 10:
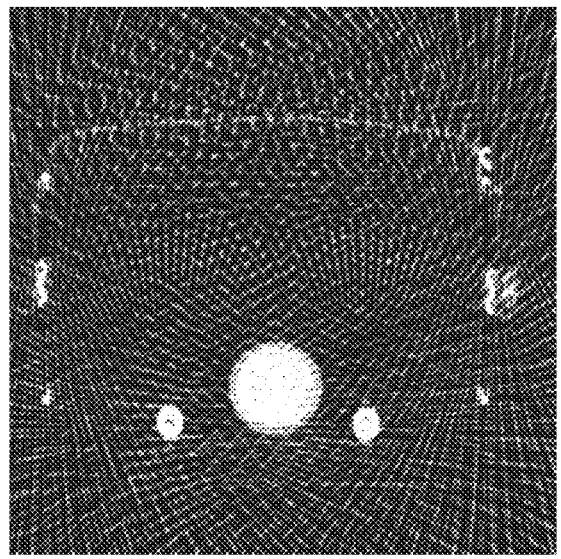
FIG. 10 shows an example of an image with aliasing artifact.
Figure 11:
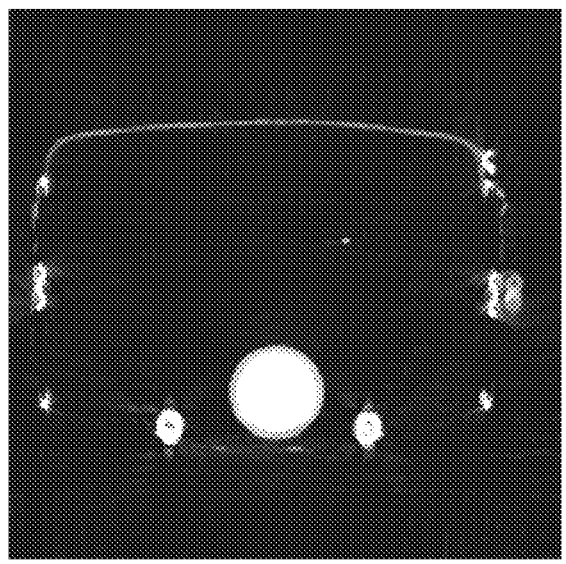
FIG. 11 shows an example of processing the image with aliasing artifact using a full-sample image.

The above method may also be used in removal of aliasing artifact. During the CT scanning operation, sparse-sampling in angle direction often leads to severe aliasing artifact (as shown in FIG. 10). A full-sampled image can be introduced through the above method. The image may be used as reference to restore images of good quality, and remove aliasing artifact while maintaining structural characteristics of the images. FIG. 11 shows the processing result.

According to further embodiments of the present invention, the method illustrated in the embodiments can increase resolution of a lower-resolution image by use of a higher-resolution image. In addition, the method illustrated in the embodiments enables contrast or edge enhancement of a poor-quality image by use of an image having better contrast or clearer edge.

Further, the method illustrated in the embodiments is a feasible, effective and robust method of image fusion. The method can work in a multimodal imaging process, for example, during the CT (Computerized Tomography)/PET (Positron Emission) scanning. A CT image contains good structure information, and a PET image reflects only focus condition. The two images may be fused through the method by extracting the structure information in the CT image and using the information to process the PET image, so as to obtain a new fusion image.

The method is still applicable to other similar fields. The method enables effective de-noising in any case where a good-quality image and an image to be de-noised have the same structure and details, but different value distributions. Dual-energy CT is an application to which the method can be applied, and merely intended to better illustrate the effects of the method. To be noted, the Gaussian Weighted Euclidean distance is used as a specific example of representation of similarity between image blocks, and any other appropriate calculation approach may be used here for such purpose.

For example, one skilled in the art will envision processing of optical images, though the above method is described using CT images. For several images of a single object photographed from different but similar view angles, for example, the images may undergo feature extraction, and then translation and rotation transforms based on the extracted features, so that two of the images are matched in structure. Then, one of the two images having higher quality may be used to modify the other image having lower quality. The modified image may be transformed to its original view angle. In this way, it is possible to process an image of lower or deteriorated quality using a photographed image of higher quality, and thus improve image quality while maintaining the content in the lower-quality image.

Various embodiments of the apparatus and method for producing distributed x-rays have been described in detail with reference to block diagrams, flowcharts, and/or examples. In the case that such block diagrams, flowcharts, and/or examples include one or more functions and/or operations, those skilled in the art will appreciate that each function and/or operation in the block diagrams, flowcharts, and/or examples can be implemented, individually and/or collectively, as various hardware, software, firmware or substantially any combination thereof. In an embodiment, several parts of the subject matters illustrated in the embodiments, such as control process, may be implemented with application specific integrated circuit (ASIC), field programmable gate array (FPGA), digital signal processor (DSP) or any other integrated format. Those skilled in the art will appreciate that some aspects of the embodiments disclosed here, in part or as a whole, may be equivalently implemented in integrated circuit, as one or more computer programs running on one or more computers (e.g., one or more programs running on one or more computer systems), as one or more programs running on one or more processors (e.g., one or more programs running on one or more microprocessors), in firmware, or in substantially any combination thereof. Those skilled in the art are able to design circuits and/or write software and/or firm codes according to the present disclosure. Further, those skilled in the art will appreciate that the control process in the present disclosure can be distributed as various forms of program products. Whatever specific type of signal bearing medium is used to fulfill the distribution, the example embodiments of the subject matters of the present disclosure are applicable. Examples of the signal bearing medium include but not limited to recordable medium, such as floppy disk, hard disk drive, compact disk (CD), digital versatile disk (DVD), digital tape, computer memory, and transmission-type medium, such as digital and/or analog communition medium (e.g., optical fiber cable, waveguide, wired and wireless communication link).

The present invention has been described with reference to several exemplary embodiments. It will be appreciated that the terms used here are for illustration, are exemplary other than limiting. The present invention can be practiced in various forms within the spirit or subject matter of the present invention. It will be appreciated that the foregoing embodiments are not limited to any of the above detailed description, and should be construed in a broad sense within the spirit and scope defined by the appended claims. All changes and variations falling into the scope of the claims or their equivalents should be encompassed by the appended claims.

What is claimed is:

1. An image processing method in an image processing apparatus, comprising:
    for a subject pixel in a subject image, determining a pixel corresponding to the subject pixel in the reference image, wherein one of a plurality of images matched in structure being selected as the reference image, and another of the images being selected as the subject image;
    calculating similarity values of at least part of pixels in the reference image with respect to the pixel corresponding to the subject pixel;
    establishing weight coefficients based on the similarity values, and weighted averaging the subject pixel in the subject image to obtain a processed pixel value.

2. The image processing method of claim 1, wherein said calculating similarity values of at least part of pixels in the reference image with respect to the pixel corresponding to the subject pixel comprises:
    calculating, as similarity value, a Gaussian weighted Euclidean distance between each of image blocks where the at least part of pixels in the reference image are respectively located and an image block corresponding to an image block where the subject pixel is located.

3. The image processing method of claim 1, wherein said calculating similarity values of at least part of pixels in the reference image with respect to the pixel corresponding to the subject pixel comprises:
    calculating, as similarity value, a structure similarity index between each of image blocks where the at least part of pixels in the reference image are respectively located and an image block corresponding to an image block where the subject pixel is located.

4. The image processing method of claim 2, wherein if a difference between an average of pixels in an image block where certain pixel in the reference image is located and an average of pixels in the image bock where the subject pixel is located is greater than a predetermined threshold, no similarity value is calculated for the two pixels.

5. The image processing method of claim 1, wherein a specific region containing the subject pixel is selected from the subject image, and said calculating similarity values of at least part of pixels in the reference image with respect to the pixel corresponding to the subject pixel comprises:
    calculating, as similarity value, a Gaussian weighted Euclidean distance between each of image blocks where pixels in a corresponding specific region in the reference image are respectively located and an image block corresponding to an image block where the subject pixel is located.

6. The image processing method of claim 1, wherein a specific region containing the subject pixel is selected from the subject image, and said calculating similarity values of at least part of pixels in the reference image with respect to the pixel corresponding to the subject pixel comprises:
    calculating, as similarity value, a structure similarity index between each of image blocks where pixels in a corresponding specific region in the reference image are respectively located and an image block corresponding to an image block where the subject pixel is located.

7. The image processing method of claim 5, wherein if a difference between an average of pixels in an image block where certain pixel in the corresponding specific region in the reference image is located and an average of pixels in the image bock where the subject pixel is located is greater than a predetermined threshold, no similarity value is calculated for the two pixels.

8. The image processing method of claim 1, wherein said determining a pixel corresponding to the subject pixel in the reference image comprises: determining the corresponding pixel in the reference image based on location information of the subject pixel in the subject image.

9. The image processing method of claim 1, wherein the reference image has higher image quality than the subject image, and the image quality comprises one of signal-to-noise ratio, sharpness, contrast, resolution, and definition.

10. The image processing method of claim 1, wherein the reference image comprises a high-energy or low-energy attenuation coefficient image obtained by a dual-energy CT imaging system, and the subject image comprises an atomic number image or an electron density image.

11. The image processing method of claim 10, wherein the high-energy or low-energy attenuation coefficient image is used to correct metal artifact in the electron density image or the atomic number image.

12. The image processing method of claim 1, wherein the reference image comprises a full-sample image, and the subject image comprises a sparse-sample image.

13. The image processing method of claim 12, wherein the full-sample image is used to correct aliasing artifact in the sparse-sample image.

14. The image processing method of claim 1, wherein a pixel having a higher similarity value corresponds to larger weight, and a pixel having a lower similarity value corresponds to smaller weight.

15. The image processing method of claim 1, wherein the reference image comprises CT image, and the subject image comprises an image obtained from PET or SPECT modality.

16. An image processing apparatus comprising:
    means for selecting one of a plurality of images matched in structure as reference image, and selecting another of the images as subject image;
    means for determining, for a subject pixel in the subject image, a pixel corresponding to the subject pixel in the reference image;

means for calculating similarity values of at least part of pixels in the reference image with respect to the pixel corresponding to the subject pixel;

means for establishing weight coefficients based on the similarity values, and weighted averaging the subject pixel in the subject image to obtain a processed pixel value.

17. The image processing apparatus of claim 16, wherein said means for calculating similarity values of at least part of pixels in the reference image with respect to the pixel corresponding to the subject pixel comprises:

means for calculating, as similarity value, a Gaussian weighted Euclidean distance between each of image blocks where the at least part of pixels in the reference image are respectively located and an image block corresponding to an image block where the subject pixel is located.

18. The image processing apparatus of claim 16, wherein said means for calculating similarity values of at least part of pixels in the reference image with respect to the pixel corresponding to the subject pixel comprises:

means for calculating, as similarity value, a structure similarity index between each of image blocks where the at least part of pixels in the reference image are respectively located and an image block corresponding to an image block where the subject pixel is located.

19. The image processing apparatus of claim 16, wherein a specific region containing the subject pixel is selected from the subject image, and said means for calculating similarity values of at least part of pixels in the reference image with respect to the pixel corresponding to the subject pixel comprises:

means for calculating, as similarity value, a Gaussian weighted Euclidean distance between each of image blocks where pixels in a corresponding specific region in the reference image are respectively located and an image block corresponding to an image block where the subject pixel is located.

20. The image processing apparatus of claim 16, wherein a specific region containing the subject pixel is selected from the subject image, and said means for calculating similarity values of at least part of pixels in the reference image with respect to the pixel corresponding to the subject pixel comprises:

means for calculating, as similarity value, a structure similarity index between each of image blocks where pixels in a corresponding specific region in the reference image are respectively located and an image block corresponding to an image block where the subject pixel is located.

21. The image processing apparatus of claim 16, wherein said means for determining a pixel corresponding to the subject pixel in the reference image comprises: means for determining the corresponding pixel in the reference image based on location information of the subject pixel in the subject image.

* * * * *